United States Patent
Quincy et al.

(10) Patent No.: US 11,929,840 B2
(45) Date of Patent: Mar. 12, 2024

(54) WEB CONFERENCE ASSET MANAGEMENT

(71) Applicant: Box, Inc., Redwood City, CA (US)

(72) Inventors: Anna Quincy, San Francisco, CA (US); Dan O'Leary, Lafayette, CA (US); Nathaniel Schlein, San Francisco, CA (US); Michelle Sangeun Oh, San Francisco, CA (US); Irving Ruan, Glendale, CA (US); Aaron Levie, Palo Alto, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 18/106,437

(22) Filed: Feb. 6, 2023

(65) Prior Publication Data
US 2023/0261891 A1    Aug. 17, 2023

Related U.S. Application Data

(63) Continuation of application No. 17/209,220, filed on Mar. 23, 2021, now Pat. No. 11,575,526.

(51) Int. Cl.
*H04L 12/18* (2006.01)
*G06F 16/906* (2019.01)
*G06F 16/907* (2019.01)

(52) U.S. Cl.
CPC ........ *H04L 12/1818* (2013.01); *G06F 16/906* (2019.01); *G06F 16/907* (2019.01); *H04L 12/1822* (2013.01)

(58) Field of Classification Search
CPC ............. H04L 12/1818; H04L 12/1822; G06F 16/907; G06F 16/906
See application file for complete search history.

(56) References Cited

U.S. PATENT DOCUMENTS

| | | | |
|---|---|---|---|
| 2004/0128354 A1* | 7/2004 | Horikiri | H04N 7/152 348/E7.083 |
| 2007/0198637 A1 | 8/2007 | Deboy et al. | |

(Continued)

OTHER PUBLICATIONS

"Global Relay Archive for Meetings," Zoom App Marketplace, date found via Internet Archive as Apr. 28, 2020, URL: https://marketplace.zoom.us/apps/89_a89mNRRm6sJXahlj8qg?zcid=1231.

(Continued)

*Primary Examiner* — John A Follansbee
*Assistant Examiner* — Raqiul A Choudhury
(74) *Attorney, Agent, or Firm* — Vista IP Law Group, LLP

(57) ABSTRACT

Management of web conference assets in a content management system. At the conclusion of a web conferencing session, an event is raised at the content management system. Various web conference assets (e.g., recordings) and web conference parameters are analyzed in conjunction with content management system metadata. Based on the analysis, one or more actions to perform on the web conference assets are determined. The content management system metadata may include user profile information of at least one web conference participant. Rules and/or a classification model that considers then-current conditions at the content management system are used singly, or in combination, to determine action characteristics and/or labels such as a retention period or security classifications to apply to the web conference assets. The web conference assets are stored in a hierarchical directory at the content management system. The hierarchy of the directory is derived from aspects of the web conferencing facility.

20 Claims, 11 Drawing Sheets

(56) References Cited

U.S. PATENT DOCUMENTS

| | | | | |
|---|---|---|---|---|
| 2012/0296914 | A1* | 11/2012 | Romanov | G11B 27/034 |
| | | | | 707/E17.101 |
| 2019/0073640 | A1* | 3/2019 | Udezue | H04L 12/1818 |
| 2019/0165963 | A1 | 5/2019 | Waki | |
| 2019/0199543 | A1* | 6/2019 | Sakamoto | G06Q 10/10 |
| 2020/0057866 | A1* | 2/2020 | Levy | H04L 12/1831 |
| 2021/0326720 | A1 | 10/2021 | Riemenschneider et al. | |
| 2022/0114281 | A1* | 4/2022 | Llamas Virgen | G06N 20/00 |

OTHER PUBLICATIONS

"Compliance Intelligence for Slack," ThetaLake, date found via Internet Archive as Apr. 21, 2020, URL: https://thetalake.com/integrations/slack/#integration.

"Video Calls Monitoring," ThetaLake, date found via Google as Jun. 2017, URL: https://thetalake.com/solutions/video-monitoring/.

"Theta Lake Integration with Microsoft Teams," ThetaLake, date found via Google as Feb. 2020.

"Enabling Compliance and Security for all Zoom Communications," ThetaLake, dated found via Google as Jun. 2017, URL: https://thetalake.com/integrations/zoom/.

Abrons, S., "Zoom Releases New Zoom Phone Features," rAVe [PUBS], dated Jan. 28, 2020, URL: https://www.ravepubs.com/zoom-new-zoom-phone-features/.

"Microsoft Teams," Global Relay, dated Aug. 28, 2019, URL: https://www.globalrelay.com/connector/microsoft-teams/.

Non-Final Office Action dated Jan. 27, 2022 for related U.S. Appl. No. 17/209,220.

Final Office Action dated Jun. 3, 2022 for related U.S. Appl. No. 17/209,220.

Notice of Allowance dated Sep. 28, 2022 for U.S. Appl. No. 17/209,220.

* cited by examiner

| Conditions | Handling Actions Pertaining to Metadata | Handling Actions Pertaining to Web Conference Assets |
|---|---|---|
| Default | Designate an expiration date (e.g., a time to evict from short-term storage) | • Save in "warm" storage |
| Legal Hold on a user/participant | Designate as Legal Hold | • Save in "hot" storage with Legal Hold designation |
| Participant has an elevated security designation or role | Designate elevated security level | • Store with elevated security label |
| Suspect PII | Designate processing status | • Quarantine<br>• Schedule PII detection<br>• Store with redacted PII |
| Defective or Corrupted Asset | Designate occurrence and detection of defect | • Do not store |
| A user/participant is deemed to be a Suspicious User | Designate as Suspicious User | • Invoke a workflow for handling suspicious users |
| Meeting topic includes a particular keyword (e.g., "Contract") | Designate as corresponding to the keyword (e.g., as contract-related) | • Invoke a finance-related retention policy to the web conference assets |
| The web conference participants overlap with one or more collaboration groups of the content management system | Designate as auto-shared | • Auto-share with the users of the determined collaboration groups |
| Meeting type is of a type corresponding to a webinar | Designate as "Webinar" | • Save with a longer designated retention period |
| Meeting included "Company-external" participants | Designate as "External" | • Save with a longer designated retention period |

1D00

FIG. 1D

WEB CONFERENCE ASSET MANAGEMENT

CROSS-REFERENCE TO RELATED APPLICATIONS

The present application is a continuation of U.S. application Ser. No. 17/209,220, now U.S. patent Ser. No. 11/575,526, filed Mar. 23, 2021 and titled "WEB CONFERENCE ASSET MANAGEMENT" which is hereby incorporated by reference in its entirety.

TECHNICAL FIELD

This disclosure relates to content management systems, and more particularly to techniques for web conference asset management within a content management system.

BACKGROUND

In today's modern world of digitally-captured and widely distributed digital data, certain data needs to be handled with great particularity, and sometimes under regulatory control. In fact some of such data might be subject to jurisdictional regulation (e.g., handling of information pertaining to national security, handing of patient information, handling of personally-identifiable information, etc.). In some situations such data might be shown (e.g., via web conference sharing) and/or discussed (e.g., in a voiceover narration) during the course of a web conference and, as such, the web conferencing materials (e.g., video recording of the web conference) need to be handled specially (e.g., marked or labeled as being sensitive, retained for a specified period, deleted, etc.). As examples, the materials (e.g., the recording and/or chat stream) from a web conference in which someone's personally identifiable information was shared should be labeled as such, and should thereafter be handled in the same manner as other documents that contain personally identifiable information. As another example, consider the case when a participant in the web conference showed a document on the screen that was designated as "Top Secret." In that case, the web conference assets should be labeled as "Top Secret", and should thereafter be handled in the same manner as other documents that are labeled as "Top Secret."

Unfortunately, there are no known techniques for determining whether or not conferencing materials need to be handled specially.

SUMMARY

This summary is provided to introduce a selection of concepts that are further described elsewhere in the written description and in the FIGURES. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for web conference asset management, which techniques advance the relevant technologies to address technological issues with legacy approaches. More specifically, the present disclosure describes techniques used in systems, methods, and in computer program products for handling web conference assets in a content management system. Certain embodiments are directed to technological solutions for combining metadata of the content management system with metadata of the web conferencing materials to determine options for handling web conference assets.

The disclosed embodiments modify and improve over legacy approaches. In particular, the herein-disclosed techniques provide technical solutions that address the technical problems attendant to determining how to handle potentially sensitive web conferencing materials. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for combining metadata of the content management system with metadata of the web conferencing materials to determine options for handling web conference assets. These techniques for combining metadata of the content management system with metadata of the web conferencing materials to determine options for handling web conference assets overcome long standing yet heretofore unsolved technological problems that arise in the realm of computer systems.

Many of the herein-disclosed embodiments for combining metadata of the content management system with metadata of the web conferencing materials to determine options for handling web conference assets are technological solutions pertaining to technological problems that arise in the hardware and software arts that underlie content management systems. Aspects of the present disclosure achieve performance and other improvements in peripheral technical fields including, but not limited to, distributed collaboration systems and data storage.

Some embodiments include a sequence of instructions that are stored on a non-transitory computer readable medium. Such a sequence of instructions, when stored in memory and executed by one or more processors, causes the one or more processors to perform a set of acts for combining metadata of the content management system with metadata of the web conferencing materials to determine options for handling web conference assets.

Some embodiments include the aforementioned sequence of instructions that are stored in a memory, which memory is interfaced to one or more processors such that the one or more processors can execute the sequence of instructions to cause the one or more processors to implement acts for combining metadata of the content management system with metadata of the web conferencing materials to determine options for handling web conference assets.

In various embodiments, any combinations of any of the above can be organized to perform any variation of acts for handling web conference assets in a content management system, and many such combinations of aspects of the above elements are contemplated.

Further details of aspects, objectives and advantages of the technological embodiments are described herein, and in the FIGURES and claims.

BRIEF DESCRIPTION OF THE DRAWINGS

The drawings described below are for illustration purposes only. The drawings are not intended to limit the scope of the present disclosure.

FIG. 1D illustrates example web conference asset handling scenarios for handling web conference assets in a content management system, according to an embodiment.

DETAILED DESCRIPTION

Figure 1A:
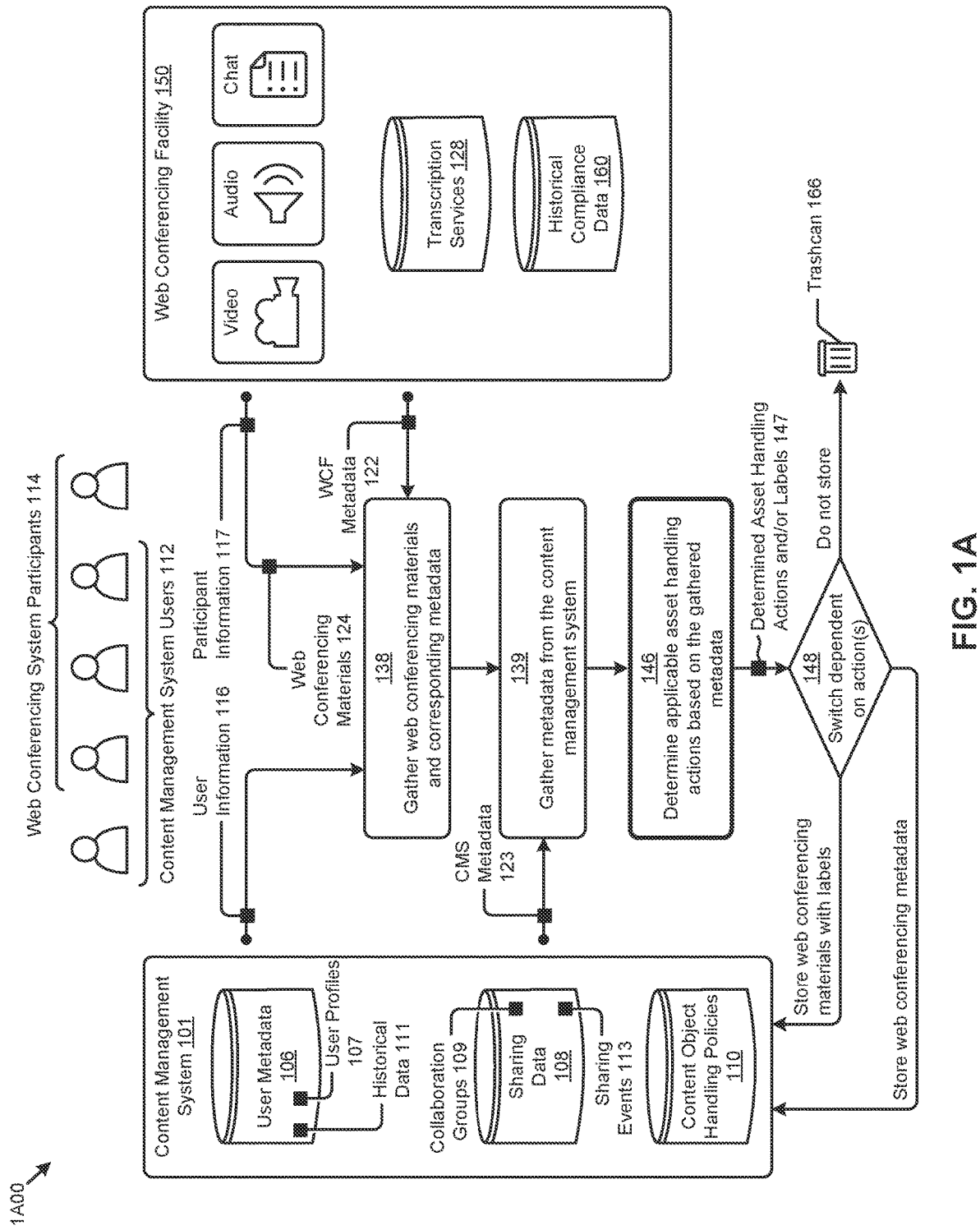
FIG. 1A exemplifies an environment in which embodiments of the disclosure can be practiced.

Aspects of the present disclosure solve problems associated with using computer systems for determining how to handle potentially sensitive web conferencing materials. These problems are unique to various computer-implemented methods for determining how to handle potentially sensitive web conferencing materials in the context of content management systems. Some embodiments are directed to approaches for combining metadata of the content management system with metadata of the web conference system to determine options for handling the web conference assets. The accompanying FIGURES and discussions herein present example environments, systems, methods, and computer program products.

Overview

Participants in a web conference often share documents with the other participants by showing, in a shared virtual surface, certain portions of a shared document. Often, all or portions of the web conference are recorded (e.g., as a video recording and/or an audio recording). Sometimes the portions that have been shared and recorded include sensitive information. This gives rise to the situation that the web conference recording itself now also contains the shared sensitive information. Accordingly, the web conference recording and any other assets of the web conference needs to be handled in a manner the same as, or similar to, the manner in which the document containing the sensitive information is handled. For example, if the document that contains the sensitive information originated from a secure storage facility that was only accessible to the sharer, then the web conference assets, or at least the portions of the assets that contain the sensitive information, should also be securely stored.

It often happens that the host of the web conference and/or other participants of the web conference are also users of a content management system and, as such, the information shared during the course of the web conference originate from files of a content management system. This situation gives rise to the possibilities that (1) the web conference assets can contain sensitive information, and (2) the web conference assets should, therefore (at least potentially) be handled in the same manner as the document or documents from which the sensitive information originated.

Disclosed herein are techniques for determining how to handle potentially sensitive web conferencing materials. More specifically, disclosed herein are techniques for combining metadata of the content management system with metadata of the web conferencing system to determine options for handling web conference assets. The disclosed techniques cover a wide range of use models. Techniques for mapping users (e.g., participants of the web conference facility with users of the content management system) are disclosed. Further, techniques for gathering metadata pertaining to the mapped users are disclosed.

Some embodiments include enriching the web conference assets with newly-generated metadata arising from outputs of transcription services. Various constituents of (1) metadata from the transcription services, (2) metadata of the users, (3) metadata from the content management system, and (4) metadata of the web conference assets themselves can be analyzed singly or in combination so as to arrive at handling options for the web conference assets. The options may derive from application of metadata-driven rules (e.g., rules that specify conditions and corresponding asset handling actions to be taken when the conditions are present). In some embodiments, web conference asset handling options may derive from consultation with a predictive model. In some embodiments, the predictive model is trained with results of the application of the foregoing rules in combination with then-present signals from the content management system.

As used herein, such web conferencing systems comprise applications that are not provided and/or maintained by the content management system provider but rather are applications that are provided and/or maintained by third parties (e.g., entities other than the maintainer of the content management system) and are merely integrated with the content management system so as to facilitate interactions pertaining to web conference asset handling.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the FIGURES. It should be noted that the FIGURES are not necessarily drawn to scale, and that elements of similar structures or functions are sometimes represented by like reference characters throughout the FIGURES. It should also be noted that the FIGURES are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which embodiments of the disclosure can be practiced. The FIGURE is being presented to illustrate relate aspects of a web conferencing facility 150 with aspects of a content management system 101. Specifically, the FIGURE is being presented to show how web conferencing system participants 114 intersect with content management system users 112, and to show how metadata from the web conferencing facility (e.g., WCF metadata 122) can be combined with content management system metadata (e.g., CMS metadata 123) so as to determine actions to be taken on the web conference assets.

Such asset handling actions might involve storing the web conferencing materials 124 (video, audio, chat, etc.) in the content management system in a manner that facilitates sharing and/or further collaboration. Or such asset handling actions might involve storing the web conferencing materials in the content management system with one or more designations (e.g., "Top Secret," "Sensitive," etc.), which designations in turn influence or govern the ongoing handling of the web conferencing materials. In some situations, the web conferencing materials are purposely not stored and instead sent to a trashcan 166 or otherwise handled to avoid any further proliferation of the web conferencing materials.

As shown, the content management system maintains a large corpus of information that is not available at the web conferencing facility 150. In the embodiment shown, the corpus of information at the content management system 101 that is not available at the web conferencing facility 150 includes user metadata 106, possibly including user profiles 107 and user-specific instances of historical data 111. Such information from the content management system (e.g., user information 116) can be used to enrich other information that derives from the web conferencing facility (e.g., participant information 117). As an example, whereas a participant in a web conference might be known to the web conference facility only by a screen name, an avatar, and/or an IP address, if the participant is also a user of the content management system, then that participant can be correlated to collaboration groups 109 and/or sharing events 113 and/or a wealth of other sharing data 108 that is captured and maintained at the content management system.

In this and other embodiments, web conferencing facility 150 includes capabilities for recording video (e.g., any imagery that is shared with other participants of the web conference during the course of the web conference), and/or capabilities for recording audio, and/or capabilities for recording chat or other intra-conference messaging. Some web conferencing facilities include or are integrated with transcription services 128 and/or other services that serve to amass then-current and historical compliance data 160. In addition to the foregoing recordings (e.g., web conferencing materials), various information that pertains to the foregoing recordings and/or other aspects a particular web conference (e.g., WCF metadata 122) can be captured by the web conferencing facility and/or its agents. The content management system can gather such web conference information on demand (step 138). In turn, the content management system can further gather certain information from the content management system (step 139), which further gathered information serves to enrich the information gathered from the web conferencing facility. The combination of metadata from the web conferencing facility and metadata from the content management system provides a wealth of information that can be used to determine asset handling actions to be taken (step 146) on the web conferencing materials 124.

As earlier indicated, asset handling actions to be taken on the web conferencing materials might include storing the web conferencing materials in the content management system with a particular one or more designations that influence or govern the ongoing handling of the web conferencing materials. In some embodiments, and as shown, the content management system includes content object handling policies 110 that are established specifically to aid enforcement that content objects of certain designations are indeed managed over time in accordance with the applicable policies. Such content object handling policies can be advantageously applied to incoming web conference assets. As used in this and other embodiments, web conference assets include a video recording of a corresponding web conferencing session. Such a video recording may include images relating to a likeness (e.g., a graphical avatar, or a text avatar) of participants. Such a video recording may include images that correspond to presentation of, and/or movement or other manipulation of graphical renderings that are shared (e.g., displayed) in one or more windows of a user interface of at least one of the participants of the session. In some cases, the graphical renderings that are shared (e.g., displayed) in one or more windows are renderings that are manipulated by a host of a session. In some cases, the graphical renderings are renderings that are manipulated by a non-host participant of a session. In some cases, the graphical renderings are renderings that include an opaque or transparent whiteboard.

As shown, the result of determining asset handling actions to be taken (e.g., based on execution of step 146) includes a set of one or more asset handling actions and one or more labels. A switch that takes different action paths (via decision 148) is configured to take the different action paths based on the determined asset handling actions and/or labels 147. In some scenarios, the web conferencing materials are stored in the content management system; in some scenarios, the web conferencing materials are deleted; in some scenarios, only the web conferencing metadata is stored in the content management system; in some scenarios, the web conferencing materials are stored in the content management system with an association to one or more content object handling policies 110 of the content management system; in some scenarios, the web conferencing materials are stored in the content management system with an association to one or more labels of the content management system. In some scenarios, the web conferencing materials are stored in the content management system with an association to one or more labels of the content management system; in some scenarios, an external user is alerted to review the web conferencing materials; in some scenarios, the web conferencing materials are moved into a different storage zone (e.g. into a United States geographical storage zone or into a United Kingdom geographical storage zone).

Strictly as examples, the foregoing labels of the content management system may be a label pertaining to a security level or security policy (e.g., "Top Secret") or a label may pertain to a geographic location or operating zone, etc. The labels, possibly in combination with content object handling policies 110 serve to ensure that content objects (e.g., web conference assets) that are associated with a particular label are managed over time in accordance with the semantics of the labels and/or associated policies.

Content management systems and web conferencing systems are often used concurrently by the same people. This is shown by the three-person overlap between the four web conferencing system participants 114 and the four content management system users 112. However, it often happens that the platform that hosts the content management system and the platform that hosts the web conferencing system are different. For example, a content management system might be hosted by "GigaFiles-R-Us, Inc.," whereas the concurrently-used web conferencing system is hosted by "Conferences-R-Us, Inc." or some other third-party. In fact the particular combination of a content management system and any of a variety of web conferencing systems may vary by industry, or by enterprise, or by locale, or by department, or even by personal preferences.

Accordingly, when there are two or more collaborators from different industries, or from different enterprises, or situated in different locales, or assigned to different departments, it often happens that at least some members of the group of users of the content management system are different than at least some members of the group of users of the messaging or collaboration system. Moreover, even when a user of a content management system is the same person as a participant on the web conferencing system, the login credentials and/or aliases, and/or other properties are semantically and/or syntactically different from the properties of the web conferencing system.

To accommodate semantic and/or syntactical similarities and differences between a web conferencing facility and a content management system, some embodiments automatically reconcile semantic and/or syntactical differences, and some embodiments automatically generate a folder and file hierarchy of sharable objects in a content management system based on a mapping of properties of the particular web conferencing system to properties of the content management system. Such an automatically-generated folder and file hierarchy can, as an option, serve as a virtual storage location for web conference assets.

Figure 1B:
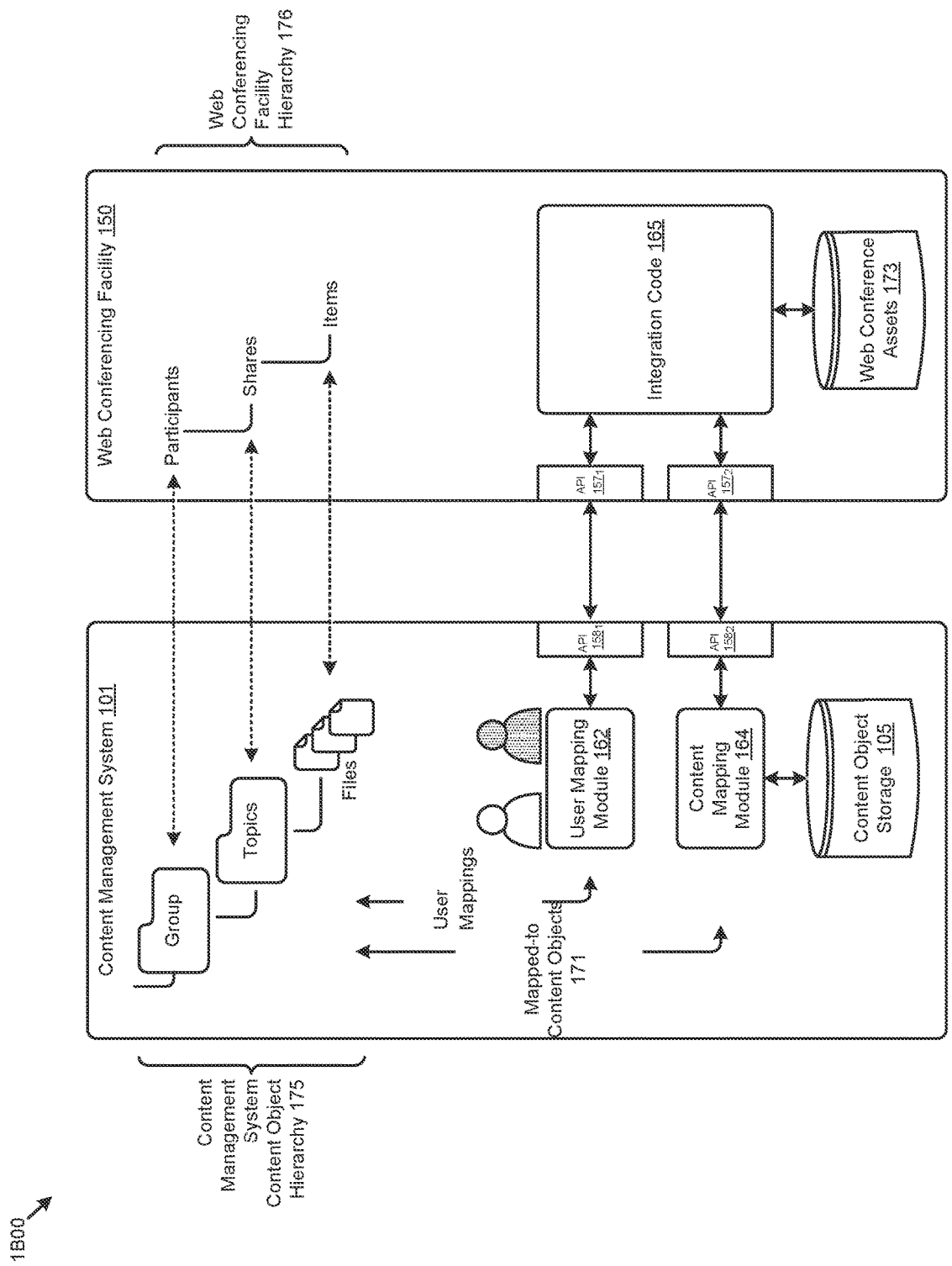
FIG. 1B illustrates example mapping techniques for mapping web conference system properties into properties of a content management system, according to an embodiment.

FIG. 1B illustrates example mapping techniques for mapping web conference system properties into properties of a content management system. As an option, one or more variations of mapping techniques 1B00 or any aspect thereof may be implemented in the context of the architecture and functionality of the embodiments described herein and/or in any environment.

As depicted by the dotted lines between content management system 101 and web conferencing facility 150, there is a correspondence between web conferencing facility hierarchy 176 and content management system content object hierarchy 175. In the shown example, a set of web conference "Participants" is mapped to a "Group" in the content management system; the "Shares" from the web conferencing facility are mapped to "Topics" in the content management system; and specific "Items" from the web conferencing facility are mapped to "Files" in the content management system. This automatically-generated folder and file hierarchy can, as an option, serve as a virtual storage location for web conference assets. As an alternative, the web conference assets can be purposely not stored in the automatically-generated folder and file hierarchy. This option—where the web conference assets are purposely not stored in an automatically-generated folder and file hierarchy—might be implemented when the web conference assets are deemed to be corrupted or defective, and/or are deemed to contain malicious code.

This situation where there are semantic and/or syntactic differences between properties of the web conferencing system and properties of the content management system is made more complex when the computing infrastructure for hosting the content management system is located in a first geographic location (e.g., in a first country), and the computing infrastructure for hosting the web conferencing system is located in a different geographic location (e.g., in a different country). More specifically, the computer representations for the foregoing properties may be specified in different languages.

To aid in reconciliation and mapping between properties, integration code 165 it situated within web conferencing facility 150 and mapping modules (e.g., user mapping module 162 and content mapping module 164) are situated within content management system 101. The systems interact over application programming interfaces (APIs). Strictly as an illustrative example, integration code 165 can communicate to user mapping module 162 via API 1571 and API 1581. The mapped-to users may be used to determine a collaboration group that corresponds to the particular event of the web conference. As another illustrative example, integration code 165 can communicate to content mapping module 164 via API 1572 and API 1582. The mapped-to content objects 171 (e.g., any one or more of the web conference assets 173) may be populated into the foregoing automatically-generated folder and file hierarchy. In some cases, there is content in addition to the web conference assets 173, and such content can be stored in content object storage 105. In some implementations of content management systems, the automatically-generated folder and file hierarchy is merely a logical construct that refers to items in content object storage 105.

Various techniques for automatically generating a folder and file hierarchy can be employed whenever there is a hierarchy in the web conferencing system that lends itself to a hierarchy of objects. As such, the implementation of FIG. 1B is merely an example and many alternatives or variations are possible. Aspects of the web conferencing facility hierarchy are mapped automatically to objects of the content management system. In the shown implementation, the web conferencing facility hierarchy 176 is either provided by the web conferencing system, or is inferred by the content management system. The web conferencing facility hierarchy can be determined in whole or in part using any known means. For example, the web conferencing facility hierarchy can be defined by a table, or by a series of parenthesized or delimiter-separated hierarchical elements, or the hierarchy of the web conferencing system can be codified in Java or JSON, etc.

The thusly-defined web conferencing facility hierarchy can drive a mapping algorithm to map from aspects of the hierarchy of the web conferencing system to objects of the content management system. In some cases, a particular mapping algorithm is selected based on the specific web conferencing system of interest. In some cases, a particular mapping algorithm is selected based on the then-current configuration of the specific web conferencing system of interest. In some cases, a particular mapping algorithm is selected based on the then-current parameters of a then-current session of the specific web conferencing system of interest. In some cases, a "Channel" of the web conferencing system is mapped to a project folder. In some cases, any one of the "Items" (e.g., shared documents, portions of discussions or comment threads, an event, etc.) is mapped to one or more files.

In some cases, the web conferencing facility is a web conferencing system (e.g., Microsoft Office Teams®, Zoom®, etc.), for which there is an implied hierarchy built into the use model. Strictly as an example, a top level of a third-party web conferencing hierarchy might correspond to the participants of the web conference session, whereas a second level of the third-party web conferencing hierarchy might correspond to a particular share (e.g., shared desktop, shared application, shared whiteboard, etc.), and whereas a third level of the third-party web conferencing hierarchy might correspond to particular items or events or types of events that are raised during the presentation of the share to the participants (e.g., an annotation on the shared desktop, chat contents that were raised while the shared application was the active share, security settings that were changed while the shared whiteboard was the active share, etc.).

A web conferencing system may have multiple implied hierarchies built into its use models. For example, a "Department" may have one or more "Channels," and each channel might have "Subscribers," or an "Enterprise" may have one or more "Projects" and each operating unit might have one or more "Teams."

In some cases, a web conferencing system is a web conferencing application that includes a native messaging facility (e.g., a chat facility). In such cases, the occurrences of messaging events (e.g., sending some text to another participant, or broadcasting a URL to all participants, etc.) can be timestamped by the web conferencing system in a manner that relates the timestamped event to the then-current web conferencing share. For example, at the moment that "Desktop A" is being shared by "User A," it can happen that "User B" sends chat content. Since the moment that "Desktop A" is being shared by "User A" can be time-stamped, and since the moment that "User B" sends chat content to the participants can also be timestamped, those two different aspects of the web conference can be interrelated, at least by the specific time indicated in the timestamp.

Any one or more of the content objects of the content management system can take on a particular set of permissions. In some cases, constituents of the object hierarchy can initially be assigned to access permissions that are derived from a particular user. In some cases, constituents of the object hierarchy can initially be assigned to access permissions that are derived from a particular channel. In some cases, constituents of the object hierarchy can initially be assigned to access permissions that are derived from a particular item.

In some cases, various web conferencing facility assets and associated web conferencing facility parameters are used to map into a directory structure in the content management system. In some cases, various web conferencing facility assets and associated web conferencing facility parameters are used to define a directory structure in the content management system. In some cases, the hierarchy of the directory structure is at least partially pre-defined, however in other cases, hierarchy of the directory structure is derived from web conferencing facility assets and associated web conferencing facility parameters. Such a hierarchical directory structure is used to store web conferencing facility assets. Strictly as examples, the content of web conferencing facility assets and associated web conferencing facility parameters may include participant information, participant role information, timestamps, hierarchical relationships between items that comprise the web conferencing facility assets, hierarchical relationships between keywords or project names that are extracted by transcription services, etc.

In some cases, a WCF hierarchy is pre-defined in the web conferencing facility. In other cases, content of the web conferencing facility assets and associated web conferencing facility parameters is used to infer a WCF hierarchy. In some cases, one or more aspects of the WCF hierarchy are correlated to a second hierarchy corresponding to a directory structure in the content management system.

The foregoing mapping of object hierarchies may further include assigning permissions to the second hierarchy. Different locations in the second hierarchy may be assigned different permissions. Further details regarding general approaches to mapping object hierarchies and permissions are described in U.S. application Ser. No. 16/948,838 titled "CROSS-PLATFORM COLLABORATION SYSTEMS" filed on Oct. 1, 2020, which is hereby incorporated by reference in its entirety.

As another illustrative example, integration code 165 can communicate with the content management system to retrieve a content object, which is then shared (e.g., in shared documents window 156) such that the participants of the web conference can see at least portions of the retrieved content object. In some cases, some of the web conferencing system participants are not content management system users. In such cases, a temporary user profile is created at the content management system to facilitate at least temporary access to the web conference assets by the web conferencing system participants who are not content management system users. Such a temporary user profile can be marked to be valid and operable for only a pre-determined duration. Such a temporary user profile can be promoted to a non-temporary user profile in the content management system.

Additionally or alternatively a web conferencing system participant who does not initially have a user profile in the content management system might be at least temporarily attached to a valid content management system user's profile. As such, the web conferencing system participant can inherit the same permissions as the content management system user profile to which the web conferencing system participant is at least temporarily attached.

In addition to automatically generating and populating a folder and file hierarchy, and in addition to mapping permissions and other properties between the two systems, some implementations of content management systems make use of specialized transcription services, results from which specialized transcription services can be used to determine actions to be taken on web conference assets. These specialized transcription services can be situated external to the content management system, or can be situated internal to the content management system, or in some architectures, the specialized transcription services can be situated partly within the content management system and partly outside of the content management system.

Figure 1C:
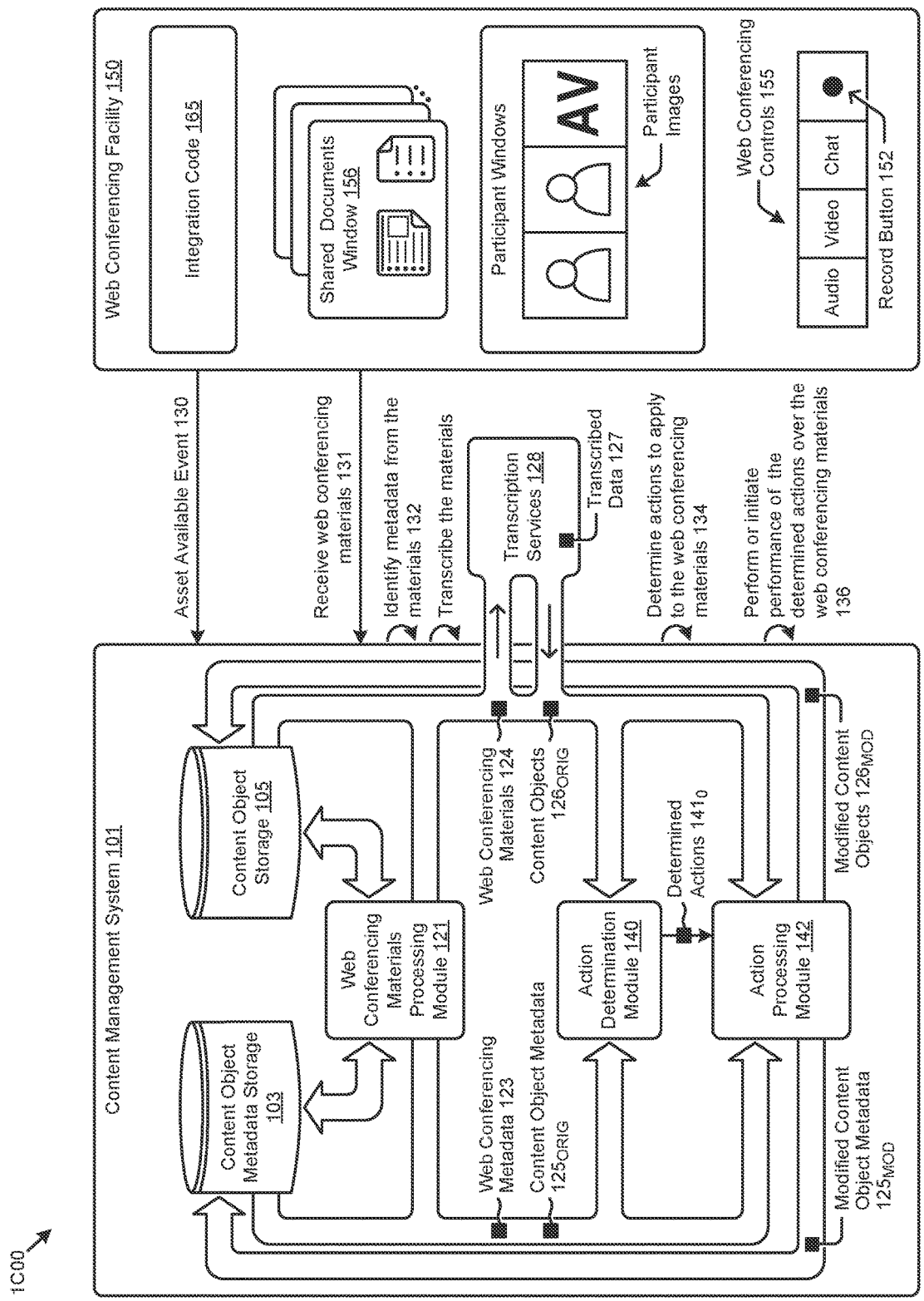
FIG. 1C illustrates example web conference asset processing techniques as implemented in a content management system, according to an embodiment.

One such implementation involving specialized transcription services to process web conference assets is shown and described as pertains to FIG. 1C.

FIG. 1C illustrates example web conference asset processing techniques as implemented in a content management system. As an option, one or more variations of web conference asset processing techniques 1C00 or any aspect thereof may be implemented in the context of the architecture and functionality of the embodiments described herein and/or in any environment.

The FIGURE is being presented to show how a content management system can be architected to use the outputs of transcription services 128 to inform an action determination module 140 that in turn outputs a set of determined actions $141_0$ to be taken over the web conference assets. Specifically, and as shown, communication paths are established between the content management system 101 and the transcription services 128. Further, communication paths are established within the content management system to facilitate movement of data to and from the processing modules (e.g., web conferencing materials processing module 121, action determination module 140, action processing module 142) and storage locations (e.g., content object storage 105 and content object metadata storage 103).

When a web conference recording becomes available (e.g., upon toggling off record button 152 of the web conferencing controls 155), integration code 165 sends an event from the web conferencing facility to the content management system (e.g., asset available event 130). Next, the content management system receives (e.g., via message 131) the assets (e.g., web conferencing materials) into web conferencing materials processing module 121 and processes the assets. One function of web conferencing materials processing module 121 is to cast the web conferencing materials into content objects that comport with one or more specific formats. For example, the web conferencing materials might be received in a format that is native to the web conferencing facility, whereas the content management system natively uses a different format. This casting can be accomplished in whole or in part by the integration code 165, or this casting can be accomplished in whole or in part by web conferencing materials processing module 121. Another function of web conferencing materials processing module 121 is to identify metadata from the web conference assets (e.g., in operation 132) and mark and store any received web conferencing metadata. Yet another function of web conferencing materials processing module 121 is to send the web conferencing materials 124 (e.g., in any applicable format) to transcription services 128 (e.g., to transcribe the materials, as shown).

The transcription services are configured to produce transcription data (e.g., shown as transcribed data 127), which in turn may be divided into a plurality of content objects (e.g., shown as content objects $126_{ORIG}$). For example, transcription services may produce a chapter-oriented binder of materials that are derived from a single video recording. Each chapter in turn may comprise (1) a text-oriented transcription of the chapter, and/or (2) a manifest of names of people mentioned in the audio portion of the recording, and/or (3) a manifest of personally-identifiable information and however many locations within the recording where the corresponding personally-identifiable information and locations are mentioned, and/or (4) a manifest of passages (e.g., a frame range) where secret, confidential, proprietary or other sensitive information is shown and/or discussed, and/or (5) a manifest of meeting topics (e.g., "This chapter comprises a financial document review") and/or (6) closed captioning for video portions of the recording, and/or (7) other derivatives from the video recording.

In some cases the transcription services might be provided with one or more seeds of context. Such seeds of context might be in the form of keywords (e.g., "contract," or "deal," or "finance" or "project", or "product" or any of the foregoing in conjunction with a corresponding specific contract identifier or deal name or project name or product name(s), etc.) so that the transcription services can explicitly identify locations within the recording where the keywords are used and/or where a discussion corresponding to the keyword or keywords takes place.

Any one or more of the content objects $126_{ORIG}$ can be subjected to additional processing before being provided to action determination module 140. The additional processing might include analyzing the foregoing manifests to identify content management system users who are deemed to be the same as the people mentioned in the audio portion of the recording. The additional processing might include preparing metadata. More specifically, and in accordance with the example shown, certain additional processing is carried out in the web conferencing materials processing module so as to gather and/or produce content object metadata $125_{ORIG}$ which corresponds to content objects $126_{ORIG}$.

The action determination module processes inputs that derive from any aspect of any data of the content management system, possibly in combination with any of the data that is produced by the transcription services. The action determination module uses these inputs to determine actions to apply to the web conferencing materials (operation 134) and assemble a set of determined actions $141_0$ into a format that can be received by action processing module 142. The determined actions can be a codification of any one or more of the asset handling actions as heretofore discussed. In some implementations, the determined actions may include any one or more actions in addition to the asset handling actions as heretofore discussed with respect to decision 148 of FIG. 1A. The determination of any or all of the foregoing actions can be based on conditions present in the content management system.

In some situations, and based on characteristics of the determined actions, and/or based on conditions present in the content management system, the action processing module will perform, or initiate performance of, the determined actions over the web conferencing materials (operation 136). In some cases, performance of the determined actions over the web conferencing materials includes casting the web conferencing materials into content objects that comport with the content object codification regime of the content management system. In some cases, performance of the determined actions over the web conferencing materials includes making changes to the web conferencing materials and/or content objects derived therefrom. In such cases, this results in modified content objects $126_{MOD}$ and/or modified content object metadata $125_{MOD}$. Strictly as example, changes to the web conferencing materials and/or to content objects therefrom (e.g., content objects $126_{MOD}$) might include redaction of portions of the video recording. Changes to content object metadata (content object metadata 125$_{MOD}$) might include a listing of what portions of the material (e.g., what range of frames or what range of timesteps) were redacted.

The foregoing redaction example is merely one example scenario for handling web conference assets. This and various other scenarios for handling web conference assets in a content management system are shown and discussed as pertains to FIG. 1D.

FIG. 1D illustrates example web conference asset handling scenarios for handling web conference assets in a content management system. As an option, one or more variations of web conference asset handling scenarios 1D00 or any aspect thereof may be implemented in the context of the architecture and functionality of the embodiments described herein and/or in any environment.

The FIGURE is being presented to illustrate that there are many different scenarios under which there are many different actions that would be taken on web conference assets and/or corresponding web conference metadata. The FIGURE is intended to be merely illustrative of commonly occurring scenarios and, as such, the shown scenarios are not limiting of all possible scenarios merely because of their presence in the FIGURE.

The depicted scenarios (i.e., rows of the table) each have a condition or set of conditions that are dominant in the scenario. When the condition or set of conditions are deemed to be present at the time that decisions pertaining to handling of the web conference assets are presented, then the shown actions (i.e., actions in the same row) are carried out. There can be different actions taken on metadata as compared with actions taken on assets themselves.

To illustrate a wide range of variations in the actions that can be taken, compare the actions specified for the "Default" scenario as compared with the "Legal Hold" scenario. In the "Default" scenario, it is deemed that the web conference assets would most likely be accessed (e.g., for replay of the recording) within a relatively short time after the conclusion of the web conference. Accordingly, the web conference assets should be initially stored in "warm" or "hot" storage rather than in "cold" storage, and some metadata value should designate an expiration date, after which the web conference assets can be moved from its location in "warm" or "hot" storage to "cold" storage. This handling is different from the handling of web conference assets that are deemed to relate to a user or group or folder that is already designated as "Legal Hold" by the content management system. In such a case, when a user, or group to which the user belongs, or folder owned by the user, is marked as "Legal Hold" by the content management system, then the web conference assets are to be stored in a "hot" storage location, and with a "Legal Hold" designation. In some cases, the web conference participants include one or more users who are associated with an external company. In such as case, handling actions pertaining to metadata includes designation of any/all of the assets of the web conference with a label="External". In some cases, the presence of such a label (e.g., "External") causes additional handling actions (e.g., handling actions corresponding to a retention policy) to be fired. In one specific case, an additional handling action might be to apply a longer-term retention policy to the web conference assets.

As heretofore mentioned, the depicted scenarios each have a condition or set of conditions that correspond to the scenario. It can happen that the conditions corresponding to two or more scenarios may occur at any moment in time. As such, it is possible that the actions to be taken on the web assets can be in conflict. Resolution of such conflicts, should they occur, is discussed hereunder as pertains to FIG. 4A.

The foregoing scenario discussions are merely examples, and many other scenarios exist that have respective different handling profiles for the web conference assets and corresponding metadata.

Figure 2:
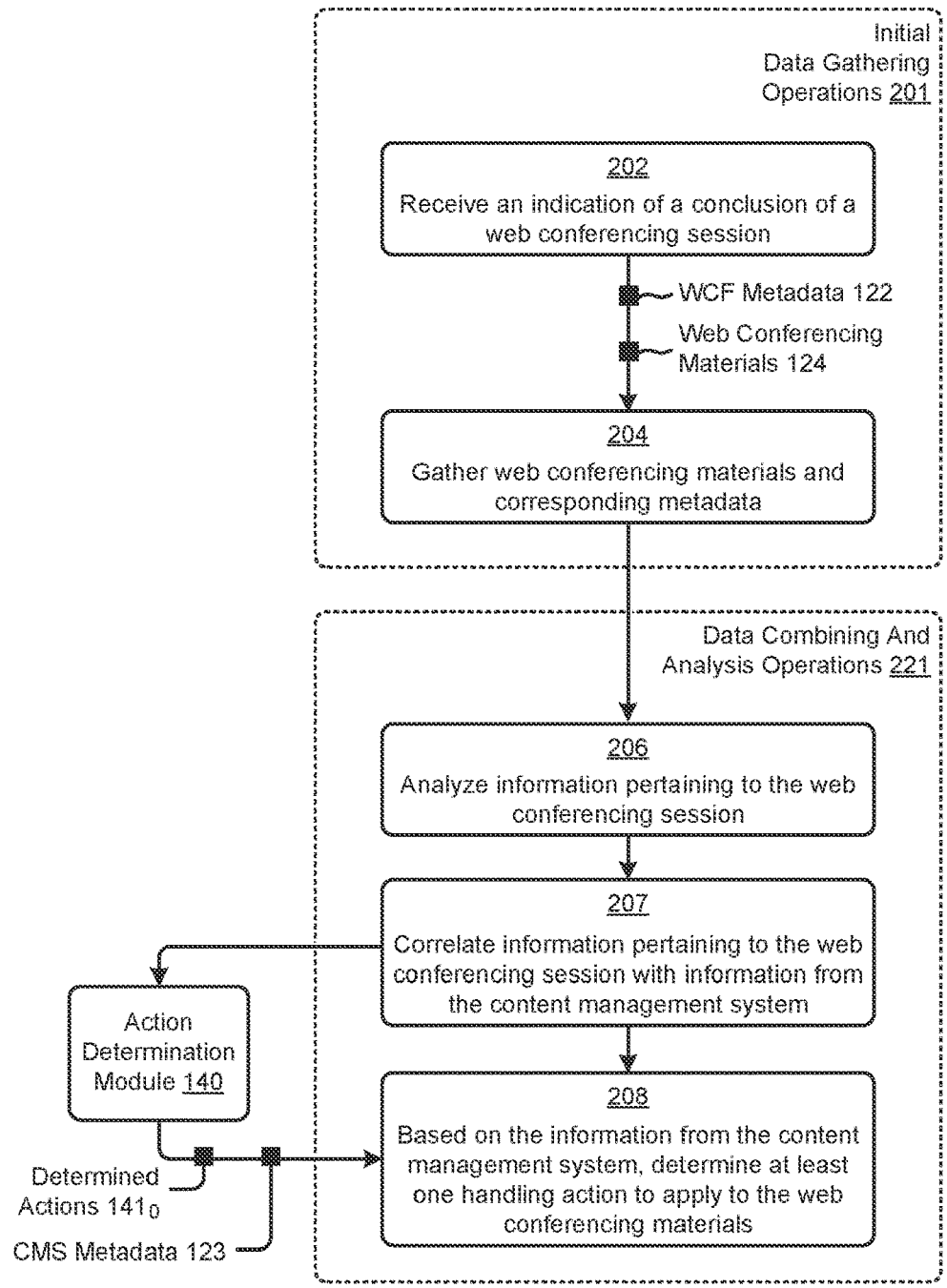
FIG. 2 presents a flowchart showing an example processing flow for determining handling actions to be taken on web conferencing materials, according to an embodiment.

FIG. 2 presents a flowchart showing an example processing flow for determining handling actions to be taken on web conferencing materials. As an option, one or more variations of processing flow 200 or any aspect thereof may be implemented in the context of the architecture and functionality of the embodiments described herein and/or in any environment.

As shown, the flowchart is divided into two sets of operations: (1) initial data gathering operations 201 and (2) data combining and analysis operations 221. The initial data gathering operations are initiated upon receipt of an indication of a conclusion of a web conferencing recording session (step 202). Such an indication of a conclusion of a web conferencing recording session can be raised, for example, by a web conferencing system when a web conference has completed. Additionally or alternatively, any indication of any event or events of a web conferencing recording session can be raised when a web conferencing recording session has been paused. In some cases, a web conference may include multiple recording sessions, and a web conference recording session may include multiple subdivisions (e.g., chapters or indexed regions).

Upon receipt of such an event and/or upon receipt of an indication of availability of a recording of the web conferencing session (or portion thereof), some of the initial data gathering operations are carried out to retrieve the web conferencing materials (step 204), plus any corresponding metadata such as metadata that is supplied by the web conferencing facility and/or its agents. In some cases, the aforementioned metadata (e.g., WCF metadata 122, as shown) is provided by the web conferencing facility together with the web conferencing recording (e.g., web conferencing materials 124, as shown). In other cases, metadata is provided by a third party, such as a transcription service provider that serves as an agent for the web conference facility.

Once the needed data has been gathered by the initial data gathering operations, processing proceeds to data combining and analysis operations 221. At step 206, the data combining and analysis operations analyzes information pertaining to the web conferencing session. The information pertaining to the web conferencing session may include video and/or audio recordings, chat streams, whiteboard captures, transcriptions, etc. Further, the information pertaining to the web conferencing session may include a manifest of participants, a timeline of session events, and/or any other information pertaining to the web conferencing session.

The foregoing information pertaining to the web conferencing session is in turn correlated (at step 207) with information from the content management system. Such information, however correlated, is used to determine how the web conferencing materials are to be handled. In some embodiments, such as is shown, such information, however correlated, is delivered to an action determination module 140, which in turn provides a set of determined actions 141$_O$. Step 208 can receive the determined actions from the action determination module as well as CMS metadata 123 and then, based on this information from the content management system, step 208 can carry out further analysis to resolve to or otherwise determine at least one handling action to apply to the web conferencing materials. The at least one handling action can specify how and where to store the web conferencing materials. A handling action can be associated with labels or other metadata values that specify a policy as to how the web conferencing materials should be handled on an ongoing basis. In some cases, a particular policy that governs how the web conferencing materials should be handled can be altered any number of times on an ongoing basis. Moreover, a particular policy that governs how the web conferencing materials should be handled can be evaluated and re-evaluated over time.

Strictly as one example, a policy for handing personally-identifiable information might include dynamically-determined actions such as is given in the policies "If <all participants are from the U.S.A> then <select a U.S. mirror site>", or "If <any participant is in Europe> then <select a European mirror site>. To accommodate policies that apply to dynamically-determined actions such that the specific then-current dynamically-determined actions can be taken over the web conferencing materials, the web conferencing materials may be labeled with a policy identifier.

In addition to, or as an alternative to, associating web conferencing materials with a policy that governs handling of the web conferencing materials, handling actions can be determined by one or both of, rules-based analysis and/or model-based analysis.

Figure 3:
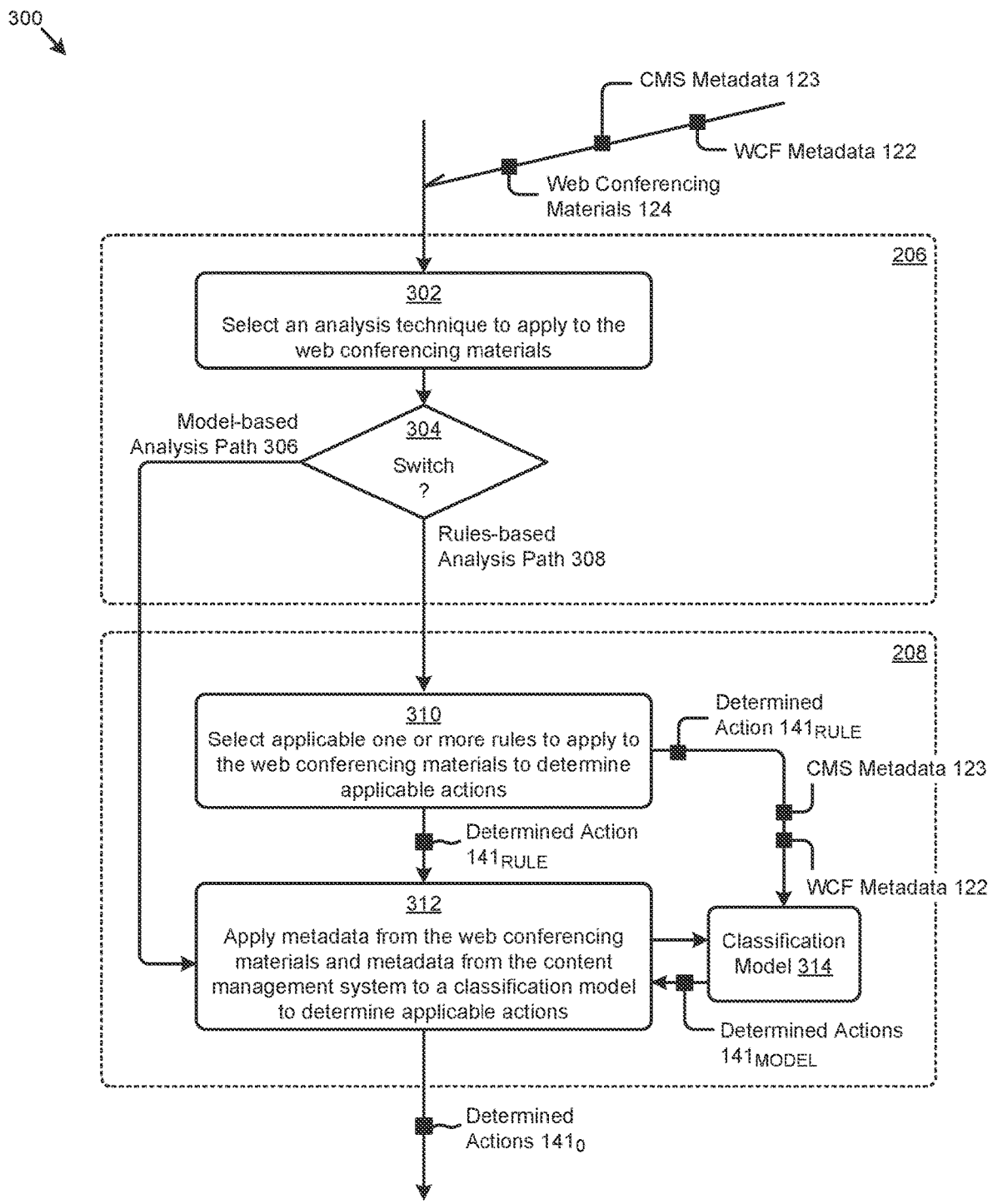
FIG. 3 illustrates several combinable or alternative action determination techniques as implemented in a content management system, according to an embodiment.

FIG. 3 illustrates several combinable or alternative action determination techniques as implemented in a content management system. As an option, one or more variations of action determination techniques 300 or any aspect thereof may be implemented in the context of the architecture and functionality of the embodiments described herein and/or in any environment.

The FIGURE is being presented to illustrate how multiple analysis techniques can be applied, singly or in combination, so as to resolve to a set of actions that apply to web conferencing materials. More specifically, the FIGURE is being presented to illustrate how a rules-based analysis techniques can be applied independently from, or in combination with, a model-based analysis technique. Further, the FIGURE is being presented to illustrate how results from a rules-based analysis can be used to train a classification model.

As shown, step 302 serves to select one or more analysis techniques to apply to the incoming instances of WCF metadata 122, and/or CMS metadata 123, and/or web conferencing materials 124. The selection criteria might pertain in part on availability of rules that inform how to handle web conferencing materials in the content management system. If there are such rules available, switch 304 will take the rules-based analysis path 308, whereas, if there are no such rules available, switch 304 will take the model-based analysis path 306.

Any one or more of the aforementioned rules can use CMS metadata 123 in conjunction with the then-current conditions and thereby emit one or more actions. There may be many rules, and in some cases conditions may be present such that multiple rules fire. In some such cases, it is possible that more than one action is emitted by a rule such that the result of operation of step 310 may include multiple determined actions. The multiple determined actions can be provided to a classification model 314 for training. The classification model can emit one or more actions based on any of a wide range of signals from, or conditions present, at the content management system.

The wide range of signals from, or conditions present at, the content management system can be signals and/or conditions that are codified in metadata. As such, and given such metadata (e.g., CMS metadata 123 and/or WCF metadata 122), step 310 can select and evaluate rules so as to determine application actions that at least potentially apply to the web conferencing materials. The determined actions from evaluation of the rule, plus signals and/or conditions of the content management system, can be used to train a classification model 314. In turn, and once at least initially trained, classification model 314 can be consulted (e.g., at step 312) to determine actions to take over the web conferencing materials.

As used herein, the terms "content management system metadata" and "CMS metadata" are used interchangeably. As used herein in this and other embodiments, the terms "content management system metadata" or "CMS metadata" refer to information about data or objects that are native to a facility that stores data or objects in an manner that supports sharing of the data or objects between collaborators. As an example, a collaboration system stores files and other objects in a persistent manner that supports concurrent access by multiple users who are grouped together into a collaboration group.

As used herein, the terms "web conferencing facility metadata" and "WCF metadata" are used interchangeably. As used herein in this and other embodiments, the terms "web conferencing facility metadata" and "WCF metadata" refer to information about objects that are native to a system or application that presents a common user interface (e.g., screen, whiteboard, etc.) to a group of participants. Such a common user interface is ephemeral in the sense that the common user interface is presented to a group of participants during a session, however that common user interface closes or is destroyed at the conclusion of a session. Web conferencing facility metadata and WCF metadata may refer to information about the participants of a session and/or to any aspect of the participants of the session, including any actions that any particular participant took during the course of the session. As an example, web conferencing facility metadata might refer to the occurrence of an intra-session message (e.g., chat) that was raised natively (e.g., from within the web conferencing system or application) at some moment during the course of the session. As another example, web conferencing facility metadata might refer to information about the progression (e.g., recording) of a session and/or to any aspect of the recording and/or its components (e.g., audio recording component, video recording component, etc.). As yet another example, web conferencing facility metadata might refer to information that was extracted from assets of a session.

Figure 4A:
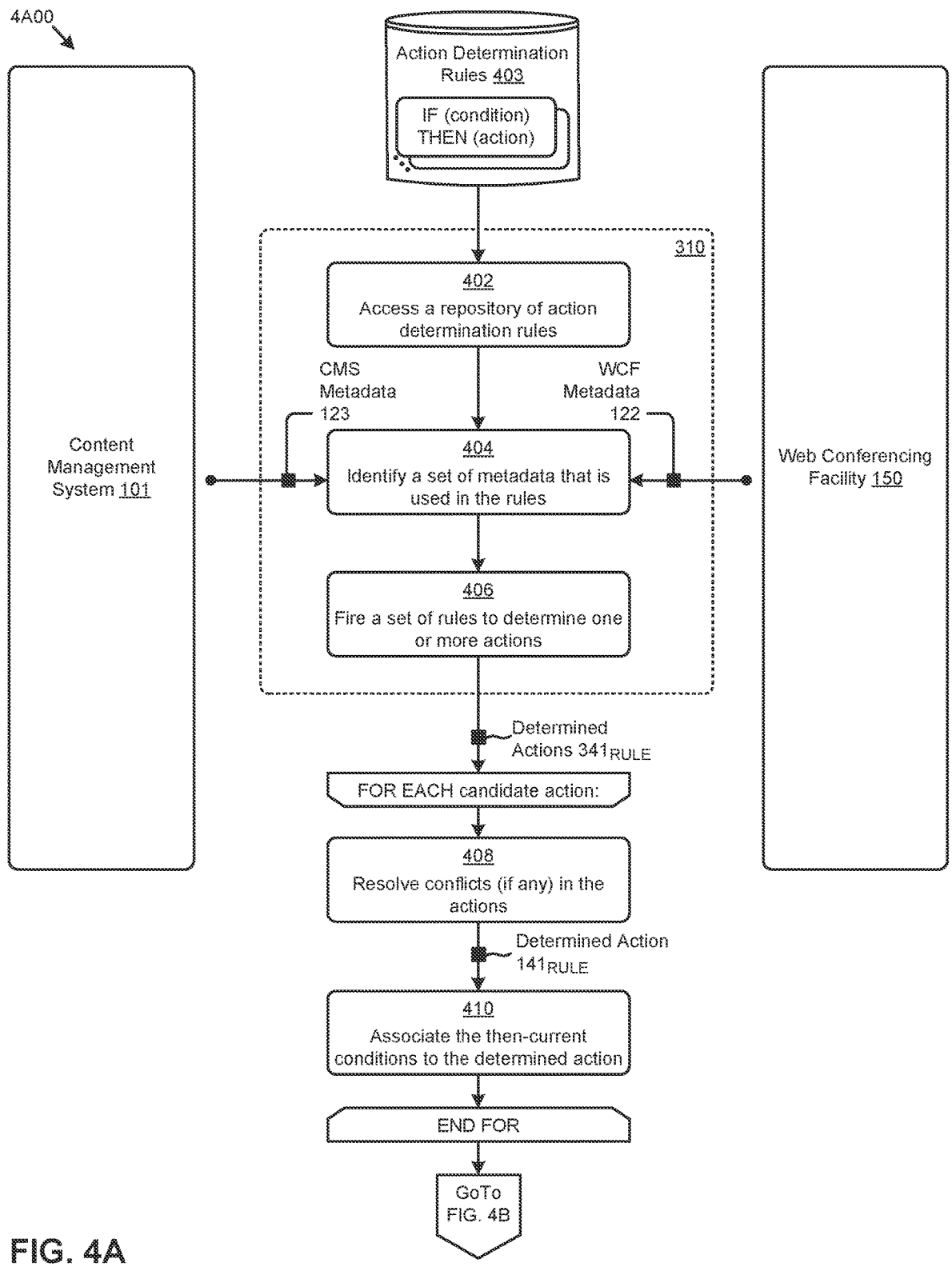
FIG. 4A shows a detailed processing flow for implementing rule-based action determination techniques in a content management system, according to an embodiment.

FIG. 4A shows a detailed processing flow for implementing rule-based action determination techniques in a content management system. As an option, one or more variations of rule-based action determination techniques 4A00 or any aspect thereof may be implemented in the context of the architecture and functionality of the embodiments described herein and/or in any environment.

The FIGURE is being presented to illustrate how a plurality of rules can fire to produce a plurality of candidate actions to be taken over the web conferencing materials, and how such candidate actions can be considered individually so as to resolve any conflicts that might be present in the semantics of the various candidate actions. The FIGURE shows a repository of action determination rules 403. The rule or rules can be evaluated based on any characteristic or characteristics (e.g., either singly or in combination) of metadata from the content management system 101 and/or the web conferencing facility 150. Rules may have the form, "IF (condition) THEN (action)".

A rule can be accessed (step 402) and metadata that pertains to the condition(s) of the rules can be identified (step 404). When there is a correspondence between an accessed rule and availability of metadata that is used in the rule, then each such rule that can be evaluated (step 406) is evaluated using the available metadata. When the conditions of the rule are deemed to be present at the time the rule is evaluated, then the rule is said to have fired. The firing of a rule emits at least one action, thus, when multiple rules fire, then multiple actions are emitted (e.g., determined actions $134_{RULE}$). The results of firing multiple rules can sometimes result in candidate actions (e.g., a first determined action $141_{RULE}$ and a second determined action $141_{RULE}$), some of which candidate actions might be in conflict with another candidate action.

To resolve conflicts that might be present due to the semantics of actions that are codified in candidate actions, a FOR EACH loop is entered. Step 408 of the loop serves to identify and resolve potential conflicts among the candidate actions. Strictly as one example, one rule might emit an action having semantics of, "store in tier3 storage", whereas a different rule might emit an action having semantics of, "store in tier1 storage". Any known technique can be used to resolve such conflicts. In some cases, more conservative actions take precedence over less conservative actions. For example, if one then-current condition is associated with a 1-year retention period and another then-current condition is associated with a 5-year retention period, then the more conservative 5-year retention period would be applied. In other cases, less conservative actions take precedence over more conservative actions. As shown, execution of step 408 results in determination of at least one action (e.g., determined action $141_{RULE}$). Such a determined action can be associated (step 410) with the then-current conditions, and the combination of the determined rule and the then-current conditions are used to train a classification model.

As heretofore discussed, multiple analysis techniques can be used, either singly or in combination, so as to resolve to a set of actions that apply to web conferencing materials. The foregoing discussion pertaining to FIG. 4A discloses how to make and use action determination rules to implement rules-based action determinations, whereas the following discussion pertaining to FIG. 4B discloses how to make use of a classification model to implement model-based action determination.

Figure 4B:
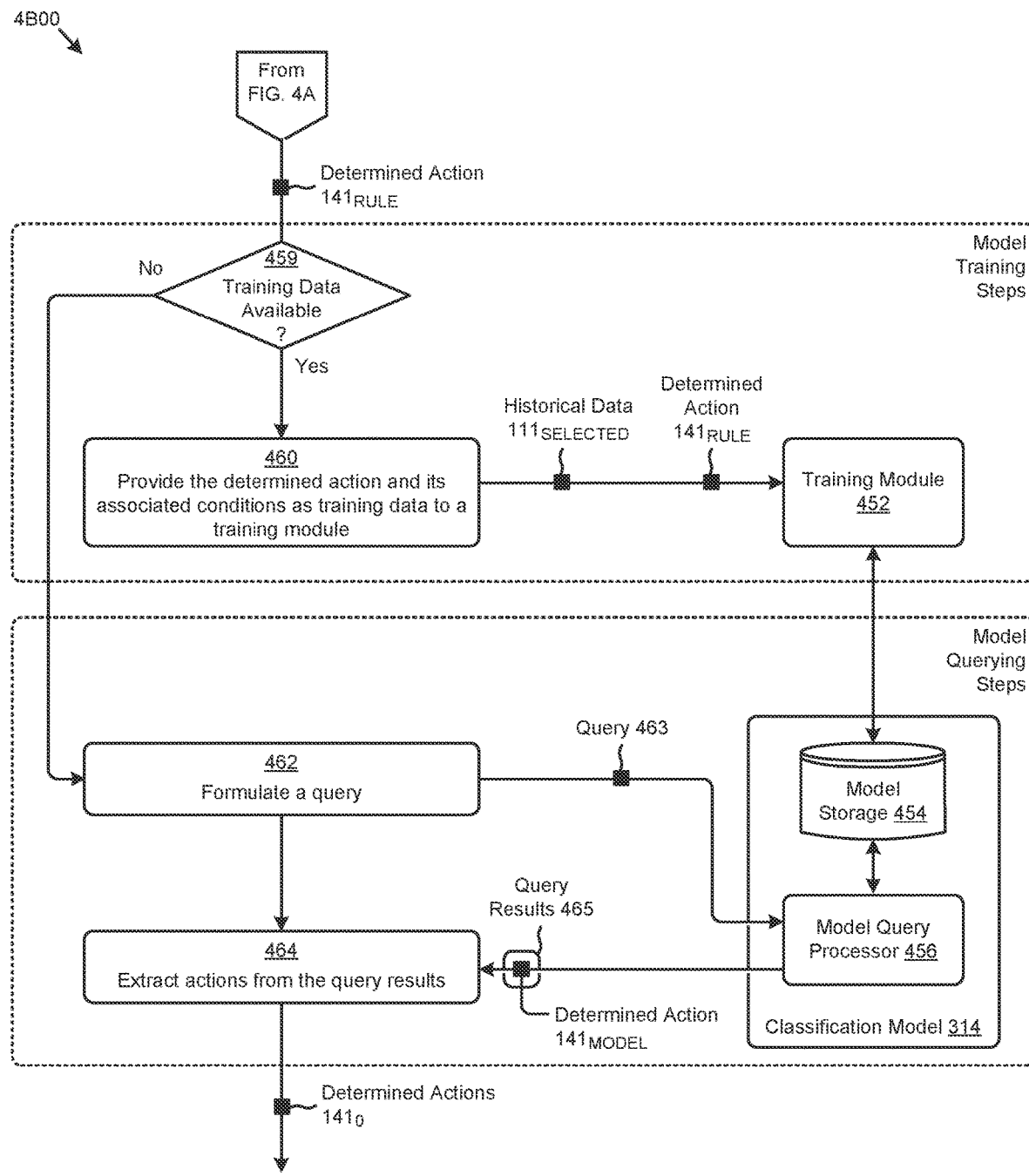
FIG. 4B shows a detailed processing flow for implementing model-based action determination techniques in a content management system, according to an embodiment.

FIG. 4B shows a detailed processing flow for implementing model-based action determination techniques in a content management system. As an option, one or more variations of model-based action determination techniques 4B00 or any aspect thereof may be implemented in the context of the architecture and functionality of the embodiments described herein and/or in any environment.

The FIGURE is being presented to explain how a classification model can be trained and queried. Specifically, the FIGURE is being presented to explain how a classification model can be trained in an unsupervised manner by using an output from a rule (e.g., determined action $141_{RULE}$).

Referring again to FIG. 4A, after one or more classification rules have fired, and after any conflicts have been resolved (step 408 of FIG. 4A), then the conditions present at that time are identified and associated with the determined action. These conditions and the associated action can be used in combination to train classification model.

This is depicted in FIG. 4B within the shown model training steps. Specifically, decision 459 serves to determine if there is sufficient training data present that relates to the incoming instance of determined action $141_{RULE}$. If not, then that incoming instance of determined action $141_{RULE}$ is not used for training (e.g., corresponding to the "No" path of decision 459). This can happen when there is insufficient additional information available at that time, and/or when there is additional information available at that time, but that additional information is merely the same information as was used to evaluate the rule. More specifically, the model can be trained in an unsupervised manner when the information used to evaluate the rule is conditionally independent from other information that is used as signal inputs to train the model.

Further details regarding general approaches to unsupervised training of a classification model are described in U.S. application Ser. No. 17/163,243 titled "SELECTING CONDITIONALLY INDEPENDENT INPUT SIGNALS FOR UNSUPERVISED CLASSIFIER TRAINING" filed on Jan. 29, 2021, which is hereby incorporated by reference in its entirety.

In the example shown, when there is sufficient training data present that relates to the incoming instance of determined action $141_{RULE}$, then step 460 serves to select a set of model inputs (e.g., historical data $111_{SELECTED}$) that are known to be conditionally independent from the particular instance of determined action $141_{RULE}$. The historical data $111_{SELECTED}$ can be gathered using any known technique. In some cases the training module 452 is configured to select and gather a set of model inputs that are known to be conditionally independent from the particular instance of determined action $141_{RULE}$. The training module can store the relationship between the historical data $111_{SELECTED}$ and determined action $141_{RULE}$ in model storage 454.

The constituency of the historical data $111_{SELECTED}$ may be influenced based on identification of, and existence of historical data that is apriori known to be pertinent to scenarios or conditions of interest. More specifically, the constituency of the historical data $111_{SELECTED}$ may be influenced based on identification of, and existence of historical data that is apriori known to be pertinent any of the conditions specified in any of the action determination rules. A sample set of mappings is provided in Table 1.

TABLE 1

Historical data mapping

| Rule Condition | Selected Historical Data Processing | Applicable Action or Scenario |
| --- | --- | --- |
| The host of the web conference has 'Role' = 'EXECUTIVE' | Examine users of then-current collaboration groups that intersect with the host | Assign a security label that matches the highest security classification of any collaborating user |
| Overlap between known web conference participants and then-current collaboration groups | Extract a set of users from the then-current collaboration groups | Automatically share the web conference materials with the extracted set of users |

TABLE 1-continued

Historical data mapping

| Rule Condition | Selected Historical Data Processing | Applicable Action or Scenario |
| --- | --- | --- |
| Overlap between known web conference participants and one or more then-current collaboration group | Extract the highest 'sensitivity' label from the identified collaboration groups | Automatically apply the highest sensitivity label from any of the identified collaboration groups |
| The 'topic' of the web conference is a known-sensitive topic | Correlate the 'topic' to a 'sensitivity' label | Automatically apply the 'sensitivity' label to the web conferencing materials |
| The 'topic' of the web conference is 'Finance' | Correlate the 'Finance' topic to a 'sensitivity' label | Automatically apply the 'sensitivity' label to the web conferencing materials |
| The 'web_conference_type' = 'webinar' | Examine users of then-current collaboration groups that intersect with the host | Retain the automatically shared web conference materials for a longer period of time |
| Some of the user/participants are situated in different geographic zones | Evaluate policies that pertain to the different geographic zones | Retain several copies of the web conference material, each with a correspondence to policies that pertain to the different geographic zones |
| Some of the user/participants are situated in different geographic zones | Evaluate policies that pertain to the different geographic zones | Retain a copies of the web conference material only one selected geographic zone |
| The web conference materials include personally-identifiable information (PII) | Examine the role or roles of the persons whose PII is had been shared in the web conference | Invoke a role-dependent workflow for each instance of PII that had been shared |
| A subject document that was shared by a user/participant in the web conference is indicated to include personally-identifiable information (PII) | Check historical data to see if any of the other user/participants have downloaded the subject document | Raise a security event that the other user/participant who downloaded the subject document is a suspicious user |
| A document that was shared by a user/participant in the web conference is marked as 'Internal Only' | Check historical data to see if any of the other user/participants have downloaded the 'Internal Only' document | Raise a security event that the other user/participant who downloaded the 'Internal Only' document is a suspicious user |

In the case that decision 459 determines that there is not sufficient training data present that relates to the incoming instance of determined action $141_{RULE}$, (e.g., corresponding to the "No" path of decision 459), then that specific incoming instance of determined action $141_{RULE}$, is not used for training. Instead, processing proceeds to the shown model querying steps. Specifically, and as shown, step 462 of the model querying steps serves to formulate a query, where the query comprises then current historical data that is formulated as stimulus to the classification model 314. Processing of query 463 is facilitated by the shown model query processor 456, which accesses the model storage so as to apply the stimulus and capture model outputs. The model query processor is configured to cast model outputs into query results 465. As shown, the query results include a determined action $141_{MODEL}$. In some cases the query results include multiple determined actions. Step 464 serves to extract actions from the query results so as to emit determined actions $141_O$. Which in turn are provided to any computing entity that can initiate the indicated actions.

Additional Embodiments of the Disclosure

Instruction Code Examples

Figure 5:
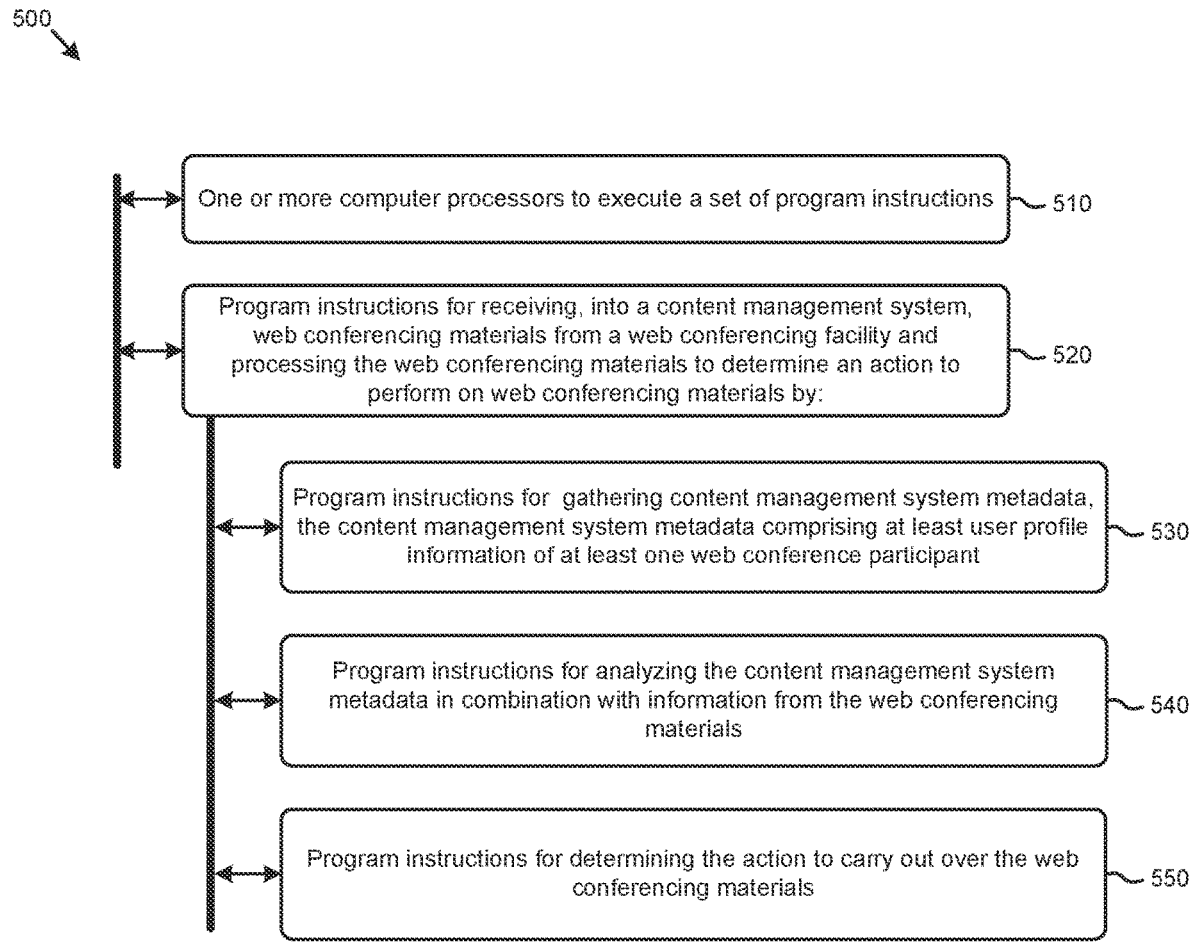
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually or as combined, serve to form improved technological processes that address determining how to handle potentially sensitive web conferencing materials. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to one or more communication paths, and any operation can communicate with any other operations over said communication paths. The modules of the system can, individually or in combination, perform method operations within system 500. Any operations performed within system 500 may be performed in any order unless as may be specified in the claims. The shown embodiment implements a portion of a computer system, presented as system 500, comprising one or more computer processors to execute a set of program code instructions (module 510) and modules for accessing memory to hold program code instructions to perform: receiving, into a content management system, web conferencing materials from a web conferencing facility (module 520), and determining an action to perform on web conferencing materials by; gathering content management system metadata, the content management system metadata comprising at least user profile information of at least one web conference participant (module 530); analyzing the content management system metadata in combination with information from the web conferencing materials (module 540); and determining the action to carry out over the web conferencing materials (module 550).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 6A:
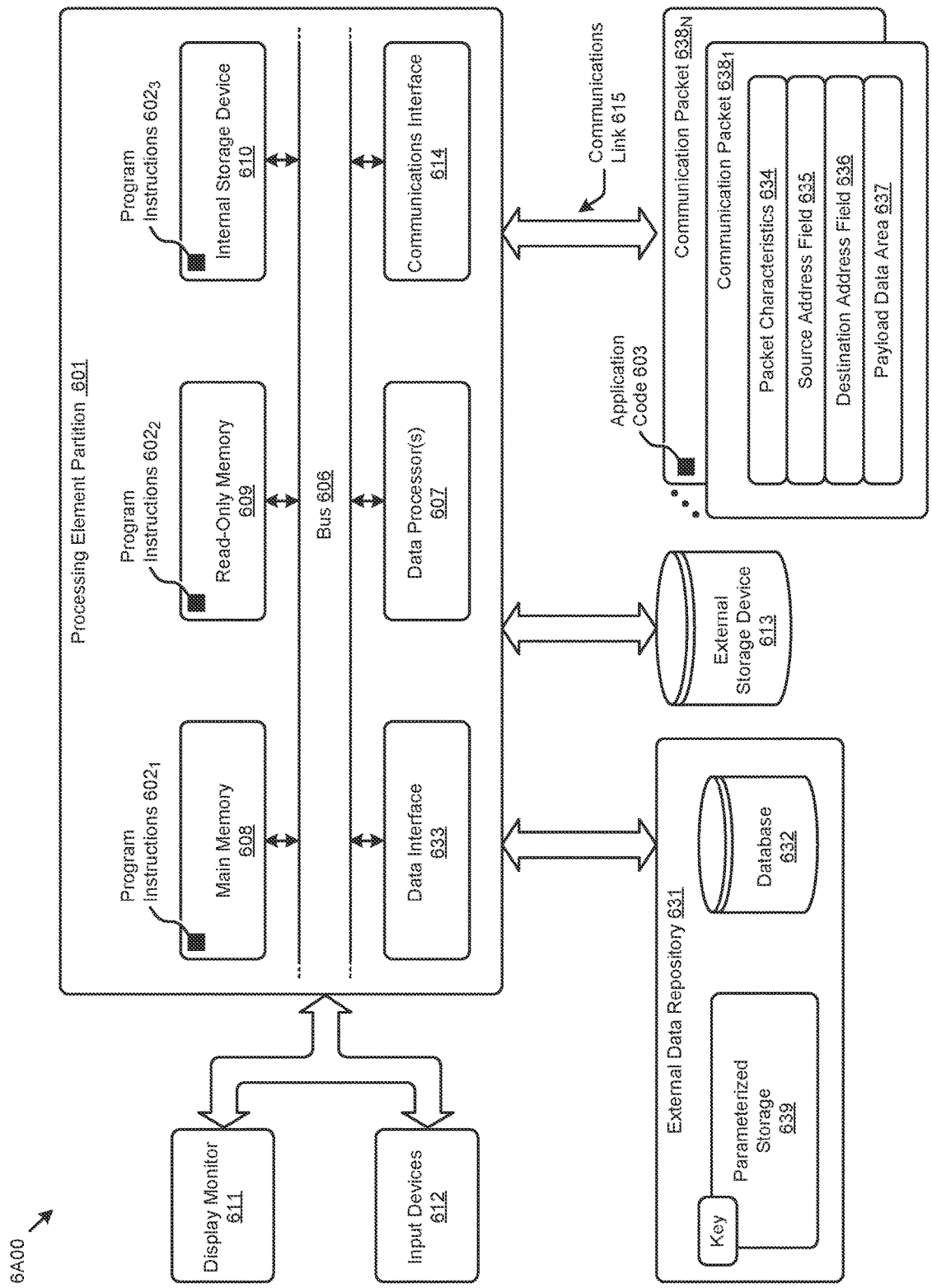
FIG. 6A and FIG. 6B present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to handling web conference assets in a content management system. A module may include one or more state machines and/or combinational logic used to implement or facilitate the operational and/or performance characteristics pertaining to handling web conference assets in a content management system.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of handling web conference assets in a content management system). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to handling web conference assets in a content management system, and/or for improving the way data is manipulated when performing computerized operations pertaining to combining metadata of the content management system with metadata of the web conferencing materials to determine options for handling web conference assets.

Figure 6B:
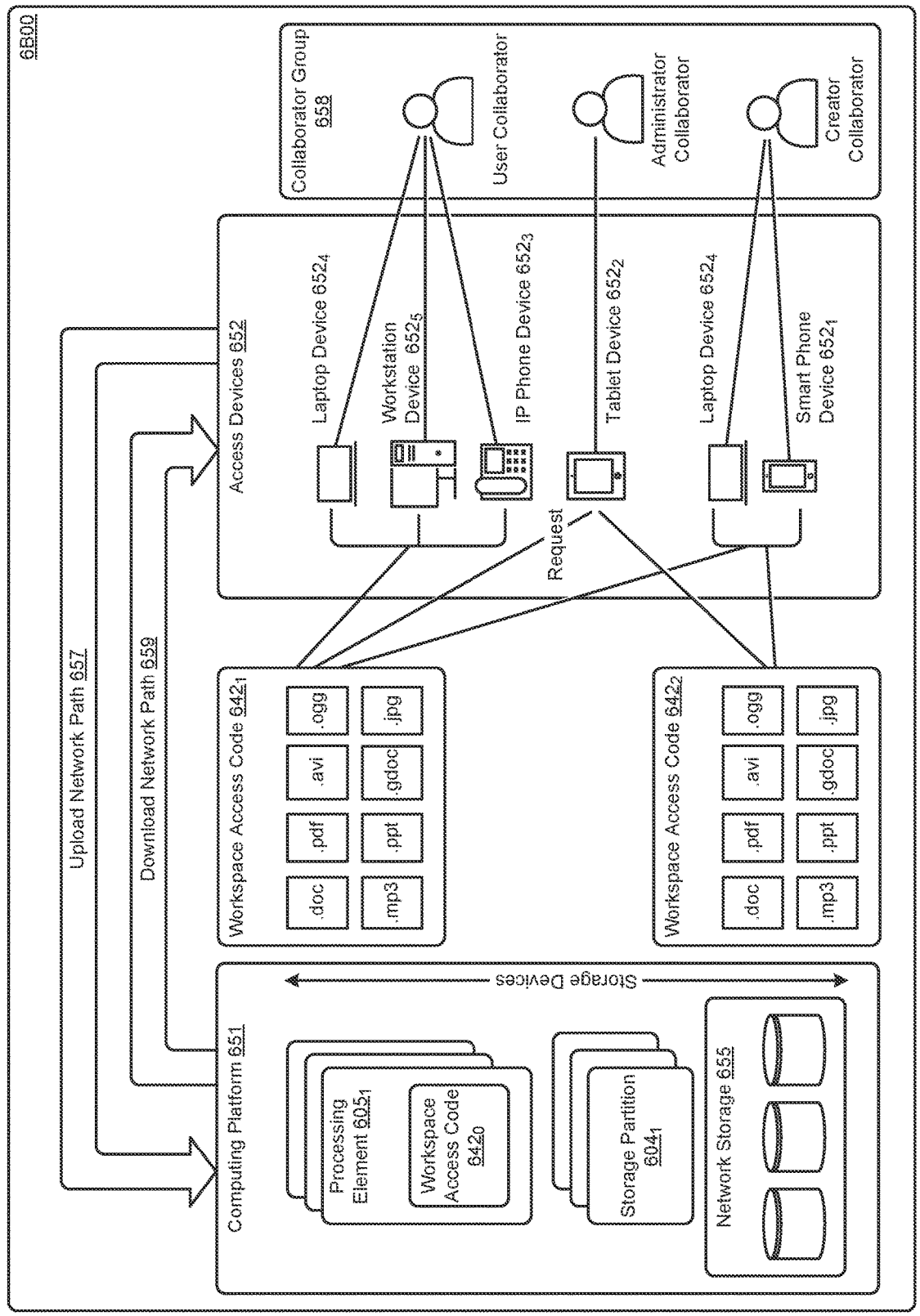

FIG. 6B depicts a block diagram of an instance of a cloud-based environment 6B00. Such a cloud-based environment supports access to workspaces through the execution of workspace access code (e.g., workspace access code 642$_0$, workspace access code 642$_1$, and workspace access code 6422). Workspace access code can be executed on any of access devices 652 (e.g., laptop device 6524, workstation device 6525, IP phone device 6523, tablet device 6522, smart phone device 652$_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element 605$_1$). The workspace access code can interface with storage devices such as networked storage 655. Storage of workspaces and/or any constituent files or objects, and/or any other code or scripts or data can be stored in any one or more storage partitions (e.g., storage partition 604$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for web conference asset management, the method comprising:

responsive to receiving, into a first field of memory of a content management system hosted at a first platform, web conferencing materials from a web conferencing facility hosted at a second platform different from the first platform, determining an action to perform on at least one of the web conferencing materials by:

gathering content management system metadata that comprises at least user profile information of at least one web conference participant;

generating a correlation between the first field in the memory with a second field in the memory based at least in part upon an analysis that retrieves an input from the first field and the second field, the second field storing information from the content management system metadata;

reconciling, at the first platform, a difference between the first and the second platforms at least by performing a transform between the first platform and the second platform, the transform comprising altering an object hierarchy in the first platform for at least some of the web conferencing materials; and determining, by a classification model, the action from one or more candidate actions to carry out over the web conferencing materials based at least in part on the transform.

2. The method of claim 1, wherein the transform is performed between a property for the first platform and a corresponding property for the second platform and the transform comprises altering the object hierarchy based at least in part upon the corresponding property for the second platform.

3. The method of claim 2, wherein altering the object hierarchy is performed based at least in part upon the corresponding property for the second platform.

4. The method of claim 1, wherein the classification model generates the one or more actions at least by evaluating a rule by using at least a signal or a condition that is codified in the content management system metadata and received at the classification model.

5. The method of claim 1, further comprising training the classification model with at least the one or more candidate actions and the action, wherein the one or more candidate actions are determined to be carried out on at least one of the web conference materials or at least one additional web conference material, and a candidate action of the one or more candidate actions is respectively emitted by a corresponding rule based at least in part upon a corresponding condition.

6. The method of claim 5, determining the action comprising:
generating a training dataset, the training dataset comprising the action, a rule based at least in part upon which the action is determined, and one or more then-current conditions related to the action; and
determining whether the training dataset includes sufficient training data related to the action.

7. The method of claim 6, determining the action comprising:
upon determining that the training dataset includes sufficient training data related to the action, transmitting the training dataset to the classification as an input for training the classification model.

8. The method of claim 6, determining the action comprising:
upon determining that the training dataset includes insufficient training data related to the action, formulating a query at least by using the insufficient training data as a stimulus to the classification model; and
capturing an output of the classification model as a query result in response to the stimulus, wherein the output of the classification model comprises one or more actions determined by the classification model.

9. The method of claim 1, determining the action comprising:
determining whether there exists a conflict between the one or more candidate actions; and
upon determining that there exists the conflict between the one or more candidate actions, resolving the conflict at least by determining the action based at least in part upon a respective conservativeness level of the one or more candidate actions.

10. The method of claim 1, wherein the difference comprises a semantic difference of a syntactical difference between the first platform and the second platform.

11. A non-transitory computer readable medium having stored thereupon a sequence of instructions which, when stored in memory and executed by one or more processors or processor cores, causes the one or more processors or processor cores to perform a set of acts, the set of acts comprising:
responsive to receiving, into a first field of memory of a content management system hosted at a first platform, web conferencing materials from a web conferencing facility hosted at a second platform different from the first platform, determining an action to perform on at least one of the web conferencing materials by:
gathering content management system metadata that comprises at least user profile information of at least one web conference participant;
generating a correlation between the first field in the memory with a second field in the memory based at least in part upon an analysis that retrieves an input from the first field and the second field, the second field storing information from the content management system metadata;
reconciling, at the first platform, a difference between the first and the second platforms at least by performing a transform between the first platform and the second platform, the transform comprising altering an object hierarchy in the first platform for at least some of the web conferencing materials; and
determining, by a classification model, the action from one or more candidate actions to carry out over the web conferencing materials based at least in part on the transform.

12. The non-transitory computer readable medium of claim 11, wherein the transform is performed between a property for the first platform and a corresponding property for the second platform and the transform comprises altering the object hierarchy based at least in part upon the corresponding property for the second platform.

13. The non-transitory computer readable medium of claim 12, wherein altering the object hierarchy is performed based at least in part upon the corresponding property for the second platform.

14. The non-transitory computer readable medium of claim 11, wherein the classification model generates the one or more actions at least by evaluating a rule by using at least a signal or a condition that is codified in the content management system metadata and received at the classification model.

15. The non-transitory computer readable medium of claim 11, the set of acts further comprising training the classification model with at least the one or more candidate actions and the action, wherein the one or more candidate actions are determined to be carried out on at least one of the web conference materials or at least one additional web conference material, and a candidate action of the one or more candidate actions is respectively emitted by a corresponding rule based at least in part upon a corresponding condition.

16. A system, comprising:
a processor or a processor core;
memory storing therein a sequence of instructions which, when executed by the processor or processor core, causes the processor or processor core to execute a set of acts, the set of acts comprising:
responsive to receiving, into a first field of memory of a content management system hosted at a first platform, web conferencing materials from a web conferencing facility hosted at a second platform different from the first platform, determining an action to perform on at least one of the web conferencing materials by:

gathering content management system metadata that comprises at least user profile information of at least one web conference participant;

generating a correlation between the first field in the memory with a second field in the memory based at least in part upon an analysis that retrieves an input from the first field and the second field, the second field storing information from the content management system metadata;

reconciling, at the first platform, a difference between the first and the second platforms at least by performing a transform between the first platform and the second platform, the transform comprising altering an object hierarchy in the first platform for at least some of the web conferencing materials; and determining, by a classification model, the action from one or more candidate actions to carry out over the web conferencing materials based at least in part on the transform.

17. The system of claim 16, the set of acts further comprising:

training the classification model with at least the one or more candidate actions and the action, wherein the one or more candidate actions are determined to be carried out on at least one of the web conference materials or at least one additional web conference material, and a candidate action of the one or more candidate actions is respectively emitted by a corresponding rule based at least in part upon a corresponding condition;

generating a training dataset, the training dataset comprising the action, a rule based at least in part upon which the action is determined, and one or more then-current conditions related to the action; and determining whether the training dataset includes sufficient training data related to the action.

18. The system of claim 17, the set of acts further comprising:

upon determining that the training dataset includes sufficient training data related to the action, transmitting the training dataset to the classification as an input for training the classification model;

upon determining that the training dataset includes insufficient training data related to the action, formulating a query at least by using the insufficient training data as a stimulus to the classification model; and capturing an output of the classification model as a query result in response to the stimulus, wherein the output of the classification model comprises one or more actions determined by the classification model.

19. The system of claim 16, the set of acts further comprising:

determining whether there exists a conflict between the one or more candidate actions; and upon determining that there exists the conflict between the one or more candidate actions, resolving the conflict at least by determining the action based at least in part upon a respective conservativeness level of the one or more candidate actions.

20. The system of claim 16, wherein the difference comprises a semantic difference of a syntactical difference between the first platform and the second platform.

* * * * *